(12) United States Patent
Suzuki

(10) Patent No.: US 6,475,678 B1
(45) Date of Patent: Nov. 5, 2002

(54) NONAQUEOUS ELECTROLYTE BATTERY

(75) Inventor: Isao Suzuki, Kyoto (JP)

(73) Assignee: Japan Storage Battery Co., Ltd., Kyoto (JP)

( * ) Notice: Subject to any disclaimer, the term of this patent is extended or adjusted under 35 U.S.C. 154(b) by 113 days.

(21) Appl. No.: 09/644,541

(22) Filed: Aug. 24, 2000

(30) Foreign Application Priority Data

Aug. 24, 1999 (JP) ............................. 11-236620
Jul. 24, 2000 (JP) ......................... 2000-222990

(51) Int. Cl.$^7$ ............................................ H01M 10/40
(52) U.S. Cl. ...................... 429/306; 429/309
(58) Field of Search .................. 429/306, 307, 429/309

(56) References Cited

U.S. PATENT DOCUMENTS

| | | | |
|---|---|---|---|
| 3,953,566 A | 4/1976 | Gore | 264/288 |
| 4,828,945 A | * 5/1989 | Nagata et al. | 429/306 |
| 4,977,007 A | * 12/1990 | Kondo et al. | 429/306 X |
| 5,011,751 A | * 4/1991 | Yoneyama et al. | 429/306 |
| 5,521,026 A | * 5/1996 | Brochu et al. | 429/307 |
| 5,585,039 A | * 12/1996 | Matsumoto et al. | 429/306 X |
| 6,316,149 B1 | * 11/2001 | Garbe et al. | 429/306 X |

FOREIGN PATENT DOCUMENTS

| | | | |
|---|---|---|---|
| GB | 0 026 381 A | 2/1980 | B29D/7/02 |
| JP | 1-167948 | 7/1989 | H01M/2/16 |
| JP | 8-195220 | 7/1996 | H01M/10/40 |
| JP | 9-259923 | 10/1997 | H01M/10/40 |
| JP | 11-102730 | 4/1999 | H01M/10/40 |

* cited by examiner

Primary Examiner—Stephen Kalafut
(74) Attorney, Agent, or Firm—Sughrue Mion, PLLC

(57) ABSTRACT

In a nonaqueous electrolyte battery, an ion-conductive polymer particles provided to be between a positive electrode and a negative electrode. The positive electrode and the negative electrode are insulated from each other by the polymer particles.

23 Claims, 5 Drawing Sheets

NONAQUEOUS ELECTROLYTE BATTERY

BACKGROUND OF THE INVENTION

1. Field of the Invention

The present invention relates to a nonaqueous electrolyte battery.

2. Description of the Related Art

A separator for nonaqueous electrolyte battery such as lithium ion secondary battery needs to not only prevent shortcircuit due to contact of positive electrode with negative electrode but also retain the electrolyte so that lithium ion can rapidly move through the electrolyte. The material of the separator needs to be not only chemically stable to organic solvents but also electrochemically stable.

Therefore, as the separator for nonaqueous electrolyte battery which is commercially available at present, there is used a porous membrane made of a polyolefin such as polyethylene and polypropylene. In such a polyolefin-based membrane, the polyolefin portion has no lithium ionic conductivity.

The production of a porous separator is carried out mainly by stretching method or wet method. The stretching method is a method for the production of a separator which comprises stretching a polymer to form directional pores in a membrane (U.S. Pat. No. 3,953,566, etc.). The wet method is a method for the production of a separator having a nondirectional network structure which comprises spreading a polymer paste to form a sheet, and then dipping the polymer sheet in a solution so that the solvent in which the polymer is dissolved is removed to form pores (GB 2,026,381).

Thereafter, the use of a solid polymer electrolyte comprising a mixture of a polyethylene oxide and a lithium salt instead of organic electrolyte as a separator has been proposed. However, such a solid polymer electrolyte has a low ionic conductivity at room temperature and thus was not put in practical use.

Then, a porous polymer electrolyte has been developed as a separator. The porous polymer electrolyte comprises a polymer which can be swollen with an electrolyte such as polyvinylidene fluoride instead of polyolefin having no lithium ionic conductivity. The porous polymer electrolyte retains an electrolyte in the pores. The polymer portion which has been swollen with the electrolyte, also, exhibits lithium ionic conductivity. A lithium ion secondary battery which comprises such a porous polymer electrolyte to improve the discharge performance at a high rate has been studied as well (JP-A-8-195220 (The term "JP-A" as used herein means an "unexamined published Japanese patent application")).

Among the methods for the production of a porous polyolefin-based separator, the wet method is applied to the preparation of a porous polymer comprising a polyvinylidene fluoride (JP-A-9-259923).

When such a porous polymer electrolyte is applied to lithium ion secondary battery, lithium ions can move into the electrolyte presented in the pores of the porous polymer electrolyte. Thus, it is expected that the high rate discharge performance of the battery can be improved.

In a nonaqueous electrolyte battery such as lithium ion secondary battery, the majority of lithium ion participating in the electrode reaction in the charge-discharge reaction is not from the amount of lithium ion dissolved in the electrolyte but from the one which is contained in the active material of an electrode. Lithium ion participated in the reaction is extracted. Namely, the lithium ion moves from the electrode through the electrolyte to the opposite electrode. Therefore, the reduction of the thickness of the separator or the control over the porosity of the separator is very important for the improvement of high rate discharge performance.

However, with the porous separator prepared by the stretching method it is difficult to reduce its thickness to about 25 $\mu$m or less and control its porosity. Therefore, it has been very difficult to prepare a nonaqueous electrolyte battery such as lithium ion secondary battery having excellent high rate discharge performance.

Further, the porous separator prepared by the wet method is disadvantageous in that the use of a large amount of an organic solvent requires a complicated production process that adds to the production cost. Moreover, the wet method is disadvantageous in that an anisotropy can easily take place in the direction of extraction of the solvent dissolving the polymer therein from the polymer paste, making it difficult to make the pore distribution uniform. Therefore, a nonaqueous electrolyte battery comprising a porous separator prepared by the wet method has a nonuniform current distribution. Thus, it is impossible to obtain sufficient high rate discharge performance and safety.

A technique has been reported, which comprises providing a porous material formed by insulating polymer particles between the positive electrode and the negative electrode as a separator to solve the foregoing problems with nonaqueous electrolytic batteries (JP-A-1-167948). A nonaqueous electrolyte battery comprising such a porous material exhibits good performance, because lithium ions can move through the electrolyte presented in three-dimensional continuous pores among the polymer particles. JP-A-1-167948 discloses a nonaqueous electrolyte battery obtained by winding a porous membrane comprising spherical resin particles bonded to each other with positive and negative electrodes.

Further, JP-A-11-102730 discloses a nonaqueous electrolyte battery comprising an insulating layer-integrated positive electrode and/or negative electrode obtained by attaching a porous resin layer formed by a particulate insulating resin to the surface of a positive electrode and/or negative electrode.

In the foregoing arrangement, this resin layer is provided to make up for the deficiency in the shutdown mechanism of the separator. A nonaqueous electrolyte battery comprising such an electrode and a porous polypropylene separator in combination has been disclosed.

However, when the polymer particles constituting the porous resin layer has no ionic conductivity, the moving path of lithium ion in the porous resin layer is increased. The curvature of the moving path of lithium ion at the border of the porous resin layer with the electrode is increased. Accordingly, the current distribution is nonuniform and hence the high rate discharge performance thereof is remarkably deteriorated.

SUMMARY OF THE INVENTION

It is an object of the present invention to obtain a nonaqueous electrolyte battery having excellent high rate discharge performance and a high safety.

According to the present invention, a nonaqueous electrolyte battery comprises an ion-conductive polymer particles provided between a positive electrode and a negative electrode, the positive electrode and the negative electrode being insulated from each other by the polymer particles.

In the foregoing nonaqueous electrolyte battery, three-dimensional continuous pores are preferably formed among the ion-conductive polymer particles, and its three-dimensional continuous pores is possible to contain a nonaqueous electrolyte. The ion-conductive polymer particles are wetted or swollen with the nonaqueous electrolyte.

In the foregoing nonaqueous electrolyte battery, the ion-conductive polymer particles have micro pores which preferably contain the nonaqueous electrolyte.

In the foregoing nonaqueous electrolyte battery, the ion-conductive polymer particles are preferably fixed to a surface of at least one of the positive electrode and the negative electrode.

In the foregoing nonaqueous electrolyte battery, the shape of the ion-conductive polymer particles is preferably sphere or the like.

In the foregoing nonaqueous electrolyte battery, the average particle size of the ion-conductive polymer particles is preferably not more than that of the active material particles of at least one of the positive electrode and the negative electrode.

In the foregoing nonaqueous electrolyte battery, the ion-conductive polymer particles preferably contain an elastomer.

BRIEF DESCRIPTION OF THE INVENTION

DETAILED DESCRIPTION OF THE INVENTION

Figure 1:
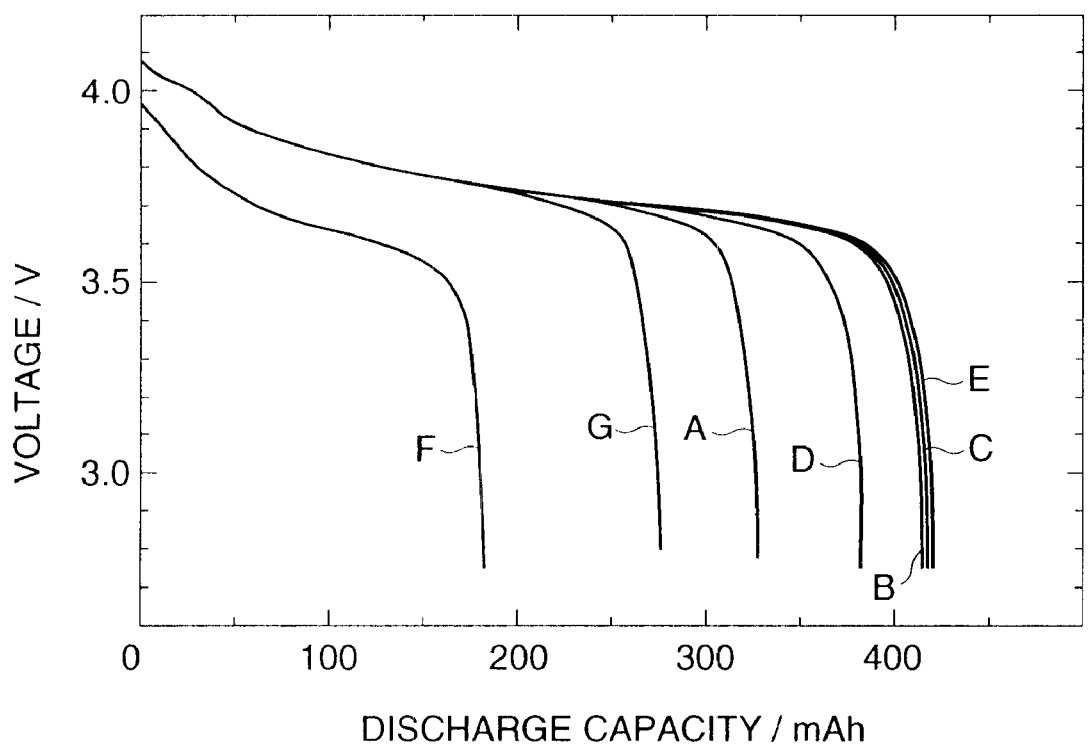
FIG. 1 is a graph illustrating discharge performance of batteries (A), (B), (C), (D) and (E) of examples according to the invention and comparative batteries (F) and (G)

The present invention concerns a nonaqueous electrolyte battery having an ion-conductive polymer particles provided between a positive electrode and a negative electrode, the positive electrode and the negative electrode being insulated from each other by the polymer particles.

In the present invention, the ion-conductive polymer particles provided between the positive electrode and the negative electrode are not electronically conductive. Thus, the positive electrode and the negative electrode are electrically insulated from each other. Accordingly, it is not necessary to provide a porous separator made of polypropylene or the like.

In the present invention, the polymer particles are ion-conductive, so that ions can move in the polymer particles. Thus, the current distribution in the positive electrode and the negative electrode is uniform. Accordingly, it is possible to obtain a nonaqueous electrolyte battery having excellent high rate discharge performance and high safety.

One of methods for rendering the polymer particles ion-conductive is to cause the polymer particles to wet or swell with a nonaqueous electrolyte. Thus, the current distribution in the positive electrode and the negative electrode is more uniform. In this case, the use of a polymer particles having a good retention of electrolyte gives further improvement of high rate discharge performance and safety of nonaqueous electrolyte battery. Because the dendritic lithium caused by non-uniformity of current distribution cannot occur resulting in no shortcircuit with heat evolution.

Further, the distribution of particle size of polymer particles is set within a predetermined range, so that the size and distribution of pores between the polymer particles can be rendered uniform. Accordingly, it is possible to render the current distribution uniform.

As the material of the ion-conductive polymer particles of the invention, there is preferably used a material such that the resulting polymer is wetted with or swollen with the electrolyte, more preferably a material which is so flexible as to change in shape that follows the volumetric expansion and shrinkage of the active material due to charge and discharge process.

In the present invention, the polymer in the polymer particles is preferably crosslinked to stabilize the shape of the polymer particles.

In the foregoing nonaqueous electrolyte battery, three-dimensional continuous pores are formed between the ion-conductive polymer particles, the three-dimensional continuous pores containing a nonaqueous electrolyte. In this arrangement, ions can smoothly move through the nonaqueous electrolyte in the three-dimensional continuous pores. Accordingly, it is possible to obtain a nonaqueous electrolyte battery having better high rate discharge performance.

In order to allow lithium ions to move more smoothly in the nonaqueous electrolyte present between the ion-conductive polymer particles, the electrolyte is required in a predetermined amount. To this end, the porosity of the ion-conductive polymer particles layer is preferably within the range of 10% to 90%.

By reducing the thickness of the ion-conductive polymer particles layer, the high rate discharge performance of the nonaqueous electrolyte battery can be improved. In this case, in order to prepare a nonaqueous electrolyte battery having a high safety, the porosity of the ion-conductive polymer particles layer is preferably within the range of 30% to 70%, more preferably 30% to 60%.

In the present invention, the control over the porosity, pore size and pore structure of the ion-conductive polymer particles layer can be accomplished by a method involving the change of the particle size or shape of the polymer particles, a method involving polymer particles having different particle sizes or shapes or a method involving pressing, stretching or heat treatment of the ion-conductive polymer particles layer.

In the foregoing nonaqueous electrolyte battery according to the present invention, the ion-conductive polymer particles have micropores which contain a nonaqueous electrolyte.

Because the ion-conductive polymer particles have micropores, the resulting micropores also retain the nonaqueous electrolyte through which lithium ions can move. Further, since lithium ions can move in the continuous pores among the polymer particles, it is possible to render the current distribution uniform. The ion-conductive polymer particles preferably have continuous micropores.

In the present invention, in order to cause the ion-conductive polymer particles to wet or swell with the nonaqueous electrolyte, the nonaqueous electrolyte battery is preferably heated, preferably to a temperature of 40° C. to 80° C.

In the foregoing nonaqueous electrolyte battery, ion-conductive polymer particles are fixed to the surface of at least one of the positive electrode and the negative electrode. It is desirable that the ion-conductive polymer particles be fixed to the surface of both the positive electrode and the negative electrode. It is more desirable that the positive electrode, the negative electrode and the ion-conductive polymer particles layer is fixed to form an integral body. In this arrangement, the electrode can hardly bend for instance during overcharging with side reaction of gas evolution by decomposition of electrolyte. Accordingly, it is possible to prevent the short current with heat evolution by melting the distance between the positive electrode and the negative electrode and hence improve the safety during overcharging.

In the present invention, the ion-conductive polymer particles are present on the surface of the electrode in the form of single layer or nearly single layer. In this arrangement, linear continuous pores are formed between the positive electrode and the negative electrode, thereby improving the high rate discharge performance.

In the present invention, supposing that the thickness of the ion-conductive polymer particles layer on the surface of the positive electrode and the negative electrode is Tp and Tn, respectively, and the thickness of the rest of the separator is Ts, the value of (Tp+Tn+Ts) is from 1 μm to 50 μm, preferably from 5 μm to 50 μm, more preferably from 5 μm to 30 μm.

The production of a nonaqueous electrolyte battery having an ion-conductive polymer particles fixed to the surface of the electrodes is obtained by one of the following steps: (1) a step of providing a polymer particles or a suspension of polymer particles on the surface of the electrodes, (2) a step of providing a preheated polymer particles or a preheated suspension of polymer particles on the surface of the electrodes, (3) a step of providing a polymer particles or a suspension of polymer particles on the surface of preheated electrodes, (4) a step of inserting an electrode into a layer containing a polymer particles, (5) a step of dipping an electrode in a suspension of polymer particles, (6) a step of spraying a polymer particles or a suspension of polymer particles onto the electrodes, and (7) a step of applying a polymer particles or a suspension of polymer particles to the electrodes. These steps may be effected in combination.

In the present invention, it is preferred that no adhesive be used. However, the polymer particles or polymer particles solution and an adhesive may be used in admixture. In this case, the volume ratio of the solid content of adhesive to the polymer particles is preferably not more than 0.15. Further, the polymer contained in the polymer particles and the polymer contained in the solid content of the adhesive are preferably the same.

Further, the uniform provision of the polymer particles or polymer particles solution on the surface of the electrodes can be accomplished by subjecting the polymer particles or polymer particles solution and/or the electrodes to vibration and/or rotation. Alternatively, the polymer particles or polymer particles solution and the electrodes may be placed under reduced pressure. These steps may be repeatedly effected.

The production of a nonagueous electrolyte battery having an ion-conductive polymer particles fixed to the surface of the electrodes also preferably involves a step of leveling the polymer particles or polymer particles solution attached to the surface of the electrodes, a step of providing a polymer particles or polymer particles solution on a roll or plate, and then transferring the polymer particles or polymer particles solution from the roll or plate to electrodes, etc. These steps are preferably followed by a step of subjecting the polymer particles to heat treatment.

In the present invention, the step of fixing the ion-conductive polymer particles to the surface of the electrodes may be effected before or after pressing of the electrodes. Even if the electrodes having an ion-conductive polymer particles fixed to the surface are pressed, there are still continuous pores among the polymer particles through which lithium ions can move. Accordingly, it is possible to maintain excellent high rate discharge performance. However, the step of fixing the ion-conductive polymer particles to the surface of the electrodes is preferably effected after pressing of the electrodes.

In the present invention, when the average particle size of the ion-conductive polymer particles is 0.5 μm or more, the pores among the polymer particles can hardly be blocked and it is possible to maintain the continuous pores between the positive electrode and the negative electrode. Thus, lithium ions can rapidly move through the nonaqueous electrolyte contained in the continuous pores. Further, lithium ions can be rapidly inserted into and extracted from the active material.

In order to prepare a nonaqueous electrolyte battery having better high rate discharge performance, the average particle size of the foregoing polymer particles is preferably 0.8 μm or more, more preferably 1.0 μm or more, even more preferably 1.2 μm or more.

In the present invention, the production of the electrode having an ion-conductive polymer particles fixed to the surface thereof preferably involves a step of subjecting the polymer particles to heat treatment. In this manner, an ion-conductive polymer particles layer can be rapidly formed on the surface of the electrodes, making it very easy to produce a nonaqueous electrolyte battery.

The step of subjecting the polymer particles to heat treatment preferably involves the heat treatment of the polymer particles at a temperature not higher than Tm° C. wherein Tm° C. is the melting point of the polymer. This is because when the heat treatment temperature is higher than Tm° C., the pores among the polymer particles are blocked.

In the present invention, the materials of the polymer particles may differ from core to shell. Supposing that the melting point of the core of the polymer particles is Tma° C. and the melting point of the shell of the polymer particles is Tmb° C., it is preferred that Tma is higher than Tmb. The step of subjecting the polymer particles to heat treatment preferably involve heat treatment of the polymer particles at a temperature of not higher than Tma° C.

In the present invention, the melting point of the polymer particles is preferably from 80° C. to 200° C., more preferably from 80° C. to 160° C., even more preferably from 80° C. to 120° C.

When the polymer particles having a melting point falling within the above defined range is used, even if large current flows due to shortcircuit or the like, the polymer particles melts due to the rise in the battery temperature to block the pores between the polymer particles. Therefore, it is difficult for current to flow and hence making it possible to inhibit the further rise in the battery temperature.

In the foregoing nonaqueous electrolyte battery, the shape of the ion-conductive polymer particles may be sphere or the like. The one point contact area of a spherical polymer particle with the surface of the electrode is less than that of polymer particles having other shapes with the surface of the electrode. Therefore, the contact area of the nonaqueous electrolyte with the surface of the electrode is great, thereby facilitating the insertion and extraction of lithium ions on the surface of the active material.

Further, because the ion-conductive polymer particles is spherical, the filling factor of the polymer particles is increased, it is difficult for shortcircuit between the positive electrode and the negative electrode to occur even if the ion-conductive polymer particles layer is thin. Moreover, the size and distribution of continuous pores formed between ion-conductive polymer particles become uniform. Further, since there is no unevenness inhibiting the movement of lithium ions, the current distribution is uniform.

The term "spherical" as used herein is meant to indicate not only complete sphere but also one deviated from complete sphere or one having an ellipsoidal or nearly ellipsoidal section.

Further, in the foregoing nonaqueous electrolyte battery according to the present invention, the average particle size of the ion-conductive polymer particles may be not more than that of the active material particles of at least one of the positive electrode and the negative electrode. In this arrangement, the curvature of the movement path of lithium ion at the border of the ion-conductive polymer particles layer with the electrode is decreased, rendering the current distribution uniform. The average particle size of the ion-conductive polymer particles is preferably not more than the average particle size of the positive active material and the negative active material.

In the foregoing nonaqueous electrolyte battery according to the present invention, the ion-conductive polymer particles may contain an elastomer. When an elastomer is incorporated in the ion-conductive polymer particles, the resulting ion-conductive polymer particles layer becomes flexible and thus is little liable to breakage when folded.

For example, when electrodes having a porous material formed by an ion-conductive polymer particles provided thereon are wound to prepare a nonaqueous electrolyte battery, the shortcircuit can hardly occur at the folded portion. Accordingly, the defective rate during the production of battery can be reduced.

Further, when an element made of the foregoing polymer particles and positive and negative electrodes is inserted into a battery case and thus is compressed, the positive and negative electrodes can easily be uniformly compressed and the distance between the positive and negative electrodes can be easily made uniform when the ion-conductive polymer particles layer has a rubber elasticity.

Moreover, even when the thickness of the electrodes changes due to the expansion and shrinkage of the active material with charging and discharging process, the positive and negative electrodes can easily be uniformly compressed and the distance between the positive and negative electrodes can be easily made uniform. Accordingly, the current distribution becomes uniform.

Even in the present invention, when the ion-conductive polymer particles is incorporated in a single body, the strength of ion conductive polymer particles layer is not quite enough for the battery assembly. In that case, the ion-conductive polymer particles may be bonded to each other to give an aggregate resulting in enhancement of its strength.

The term "aggregate obtained by binding ion-conductive polymer particles to each other" as used herein is meant to indicate one comprising two or more ion-conductive polymer particles bonded to each other or one comprising ion-conductive polymer particles bonded to other polymer particles on a part of the surface thereof.

The production process for fixing polymer particles to the surface of the electrodes in the present invention may involve a step of providing water containing polymer particles on the surface of the electrodes. This step can be effected while minimizing the amount of an organic solvent, lessening environmental hazard and making it possible to reduce the number of production steps and the production cost.

In order to inhibit the aggregation of polymer particles in water, the pH value of water containing a polymer particles is preferably from 7 to 13. In order to inhibit the aggregation of polymer particles so that the polymer particles can be uniformly provided on the surface of the electrodes, a hydroxide such as potassium hydroxide and sodium hydroxide, a surfactant such as polyethylene glycol type nonionic surfactant and fluorine-based surfactant, a water-soluble polymer such as polyethylene oxide and polyvinyl alcohol and an alcohol such as methanol and ethanol are incorporated in water containing a polymer particles singly or in admixture.

The production of the nonaqueous electrolyte battery made of a positive electrode, a negative electrode and an ion-conductive polymer particles layer integrally fixed to each other is obtained by one of the following steps: (1) a step of integrating an electrode having an ion-conductive polymer particles or a suspension of ion-conductive polymer particles solution provided on the surface thereof with the other electrode, (2) a step of integrating positive and negative electrodes having an ion-conductive polymer particles or a suspension of ion-conductive polymer particles provided on the surface thereof with each other, (3) a step of integrating an electrode having an ion-conductive polymer particles layer provided on the surface thereof with the other electrode, (4) a step of integrating positive and negative electrodes having an ion-conductive polymer particles layer provided on the surface thereof with each other, and (5) a step of integrating an electrode having an ion-conductive polymer particles or a suspension of ion-conductive polymer particles provided on the surface thereof with an electrode having an ion-conductive polymer particles layer provided on the surface thereof.

Preferred among these steps is the step of integrating an electrode having a suspension of ion-conductive polymer particles provided on the surface thereof with an electrode having a suspension of ion-conductive polymer particles layer provided on the surface thereof. It is preferred that the electrode having a suspension of ion-conductive polymer particles be a positive electrode while the electrode having an ion-conductive polymer particles layer provided on the surface thereof be a negative electrode. These steps are preferably followed by a step of subjecting the polymer particles to heat treatment.

The production of the nonaqueous electrolyte battery made of a positive electrode, a negative electrode, an ion-conductive polymer particles layer and a separator may be accomplished by the foregoing steps in combination with the separator.

In the present invention, as the material of the ion-conductive polymer particles there is preferably used one which is so flexible as to change in shape that follows the volumetric expansion and shrinkage of the active material due to charge and discharge process. In some detail, polyethylene oxide (PEO), polypropylene oxide (PPO), polyethylene (PE), polypropylene (PP), polyvinylidene fluoride (PVdF), polytetrafluoroethylene, polyvinyl fluoride, polyacrylonitrile (PAN), polyvinyl chloride, polyvinylidene chloride, polyvinylidene chloride, polymethyl methacrylate (PMMA), polymethyl acrylate, polyvinyl alcohol, polymethacrylonitrile, polyvinyl acetate, polyvinyl pyrrolidone, polycarbonate, polyethylene terephthalate, polyhexamethylene adipamide, polycaprolactam, polyurethane, polyethyleneimine, polybutadiene, polystyrene, polyisoprene, carboxymethyl cellulose, methyl cellulose, and derivatives thereof may be used singly or in admixture.

Alternatively, a copolymer is composed of various monomers constituting these polymers may be used. Specific examples of such a copolymer employable herein include vinylidene fluoride-hexafluoropropylene copolymer (P(VdF/HFP)), styrene-butadiene rubber, ethylene propylene rubber, styrene-based elastomer, fluorine-based elastomer, olefin-based elastomer, urethane-based elastomer, styrene-based elastomer, vinyl chloride-based elastomer, ester-based elastomer, and amide-based elastomer.

Preferred among these polymer particles are polymers containing fluorine such as PVdF and P (VdF/HFP), polyolefin such as PE and PP, polyether such as PEO and PPO, PAN, PMMA, and derivatives thereof, which are electrochemically stable. These polymers are preferably used singly or in admixture. Alternatively, a polymer is composed of various monomers constituting these polymers may be used.

As the polymer solvent to be used in the preparation of polymer particles, porous polymer particles, suspension of polymer particles or suspension of porous polymer particles, there may be used any solvent which can dissolve the polymer therein. Examples of such a solvent include carboxylic acid ester such as propylene carbonate, ethylene carbonate (EC), dimethyl carbonate (DMC), diethyl carbonate (DEC) and ethyl methyl carbonate, ether such as dimethyl ether, diethyl ether, ethyl methyl ether and tetrahydrofuran, ketone such as methyl ethyl ketone and acetone, dimethylformamide, dimethylacetamide, and N-methyl-2-pyrrolidone (NMP). As the non-solvent for polymer, there may be used any material which is incompatible with the polymer. Examples of such a non-solvent include water, alcohol, and acetone. These non-solvents may be used in admixture.

As the process for the production of the porous polymer particles of the invention, there is preferably used a process which includes phase separation of a polymer from a solution having the polymer dissolved in a solvent. The phase separation of polymer can be carried out by the extraction of the solvent from the polymer solution, the temperature change of the polymer solution by heating or cooling, the concentration change of the polymer solution by evaporation of the solvent. Particularly preferred among these production processes is solvent extraction process involving the extraction of solvent from the polymer solution.

In the present invention, the amount of the electrolyte in the nonaqueous electrolyte battery is preferably from not less than 30% to not more than 100% based on the total pore volume in the positive and negative electrodes, the ion-conductive polymer particles layer and the separator.

In the present invention, the electrolyte for nonaqueous electrolyte battery may be composed of a polar solvent such as EC, DEC, propylene carbonate, DMC, γ-butyrolactone, sulfolane, dimethyl sulfoxide, acetonitrile, dimethylformamide, dimethylacetamide, 1,2-dimethoxyethane, 1,2-diethoxyethane, tetrahydrufuran, 2-methyltetrahydrofuran, dioxolane andmethyl acetate or a mixture thereof.

In the present invention, as the lithium salt to be incorporated in the electrolyte, there may be used a lithium salt such as $LiPF_6$, $LiBF_4$, $LiAsF_6$, $LiClO_4$, LiSCN, LiI, $LiCF_3SO_3$, LiCi, LiBr and $LiCF_3CO_2$ or a mixture thereof.

Examples of the compound capable of lithium insertion and extraction as a negative active material to be used in the invention include graphitizable carbon such as coke, mesocarbon microbeads (MCMB), mesophase pitch-based fiber and pyrolytic vapor grown carbon fiber, non-graphitizable carbon such as sintered phenolic resin, polyacrylonitrile-based carbon fiber, pseudoisotropic carbon and sintered furfuryl alcohol resin, graphite-based material such as natural graphite, artificial graphite, graphitized MCMB, graphitized mesophase pitch-based carbon fiber and graphite whisker, metallic lithium, lithium alloy, and mixture thereof.

Examples of the compound capable of lithium insertion and extraction as a positive active material to be used in the invention include inorganic materials such as composite oxide represented by the composition formula $Li_xMO_2$ or $Li_yM_2O_4$ (in which M represents a transition metal, $0 \leq x \leq 1$, and $0 \leq y \leq 2$), oxide having tunnel-like voids, and lamellar metallic chalcogen. Specific examples of these inorganic compounds include $LiCoO_2$, $LiNiO_2$, $LiMn_2O_4$, $Li_2Mn_2O_4$, $MnO_2$, $FeO_2$, $V_2O_5$, $V_6O_{13}$, $TiO_2$, and $TiS_2$. Alternatively, an inorganic compound obtained by substituting a part of transition metal M by other elements may be used. Examples of such an inorganic compound include $LiNi_{0.8}Co_{0.2}O_2$, and $LiNi_{0.80}CO_{0.17}Al_{0.03}O_2$. As an organic compound to be used as such a lithium insertion and extraction compound, there may be used an electrically-conductive polymer such as polyaniline. The foregoing active materials may be used in admixture regardless of whether they are organic or inorganic.

In the present invention, an ion-conductive polymer particles can be provided between the positive electrode and the negative electrode. At the same time, a porous separator made of polyolefin such as polypropylene and polyethylene may be used singly or more in combination with the ion-conductive polymer particles. Alternatively, glass mat, non-woven cloth, woven cloth, polymer electrolyte, etc. may be used. These materials may be used in combination.

As the positive electrode collector to be used in the invention there may be used a metal such as aluminum. As the negative electrode collector there may be used a metal such as copper. The collector may be in any form such as sheet, foamed material, sintered porous material and expanded lattice. The foregoing collector may be pierced with holes having an arbitrary shape.

EXAMPLES

The present invention will be further described hereinafter in the following preferred examples.

Nonaqueous electrolytic batteries (A), (B), (C), (D) and (E) according to the present invention and comparative batteries (F) and (G) were prepared and compared in performance. All these positive electrodes had a width of 19 mm and a length of 480 mm. All these negative electrodes had a width of 20 mm and a length of 500 mm. The positive electrode and the negative electrode were wound together to form a elliptically cell assembly. This cell assembly thus formed was then inserted into a stainless steel case having a height of 47.0 mm, a width of 22.2 mm and a thickness of 6.4 mm. An electrolyte was then injected into the stainless steel case. The electrolyte was obtained by adding 1 mol/l of $LiPF_6$ to a 1:1 (by volume) mixture of ethylene carbonate and dimethyl carbonate to prepare a battery having a nominal capacity of 400 mAh. The composition of vinylidene fluoride/hexafluoropropylene copolymer (P(VdF/HFP)) composed of 5 mol-% of HFP. The battery case was provided with an irreversible safety valve.

Battery (A) of example of the present invention

A paste containing 70 wt-% of lithium cobaltate, 6 wt-% of acetylene black, 9 wt-% of PVdF and 15 wt-% of NMP was applied to an aluminum foil collector having a thickness of 20 μm, and then dried at a temperature of 150° C. to evaporate NMP. This procedure was made on both sides of the aluminum foil collector to prepare a positive electrode having a positive electrode compound layer provided on both sides thereof. The positive electrode was then pressed to reduce the thickness of the electrode, which is the sum of the thickness of the compound layer and the collector, from 280 μm to 175 μm. Thus, a positive electrode (X) was prepared.

A paste containing 81 wt-% of MCMB, 9 wt-% of PVdF and 10 wt-% of NMP was applied to a copper foil collector having a thickness of 14 μm, and then dried at a temperature of 150° C. to evaporate NMP. This procedure was made on both sides of the copper foil collector to prepare a negative electrode having a negative electrode compound layer provided on both sides thereof. The negative electrode was then pressed to reduce the thickness of the electrode, which is the sum of the thickness of the compound layer and the collector, from 300 μm to 190 μm. Thus, a negative electrode (Y) was prepared.

Subsequently, a suspension of a P(VdF/HFP) particle of 4 μm with free of micropores (dispersant: water) was applied to the surface of the negative electrode (Y), and then dried at a temperature of 100° C. to prepare a negative electrode (Y1) having a particulate P (VdF/HFP) layer having a porosity of about 54% and a thickness of 10 μm provided on both sides thereof.

Figure 2:
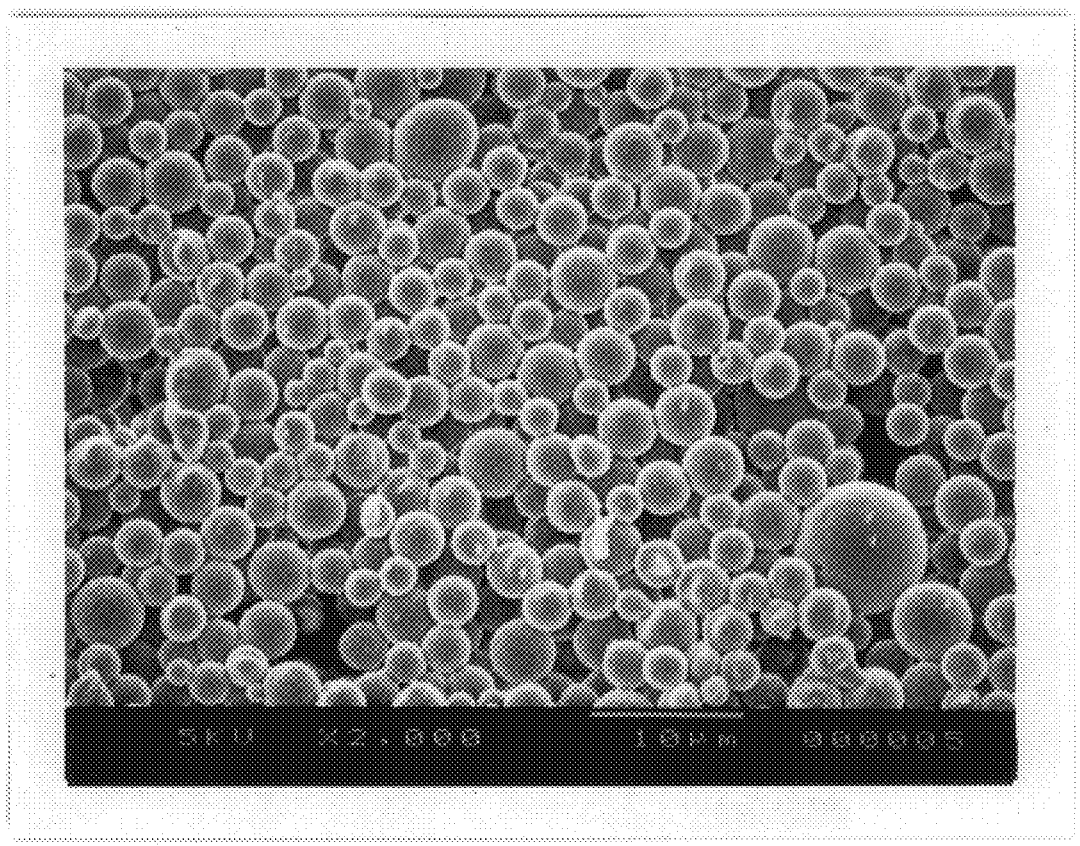
FIG. 2 is a diagram illustrating a surface of a negative electrode (Y1)
Figure 3:
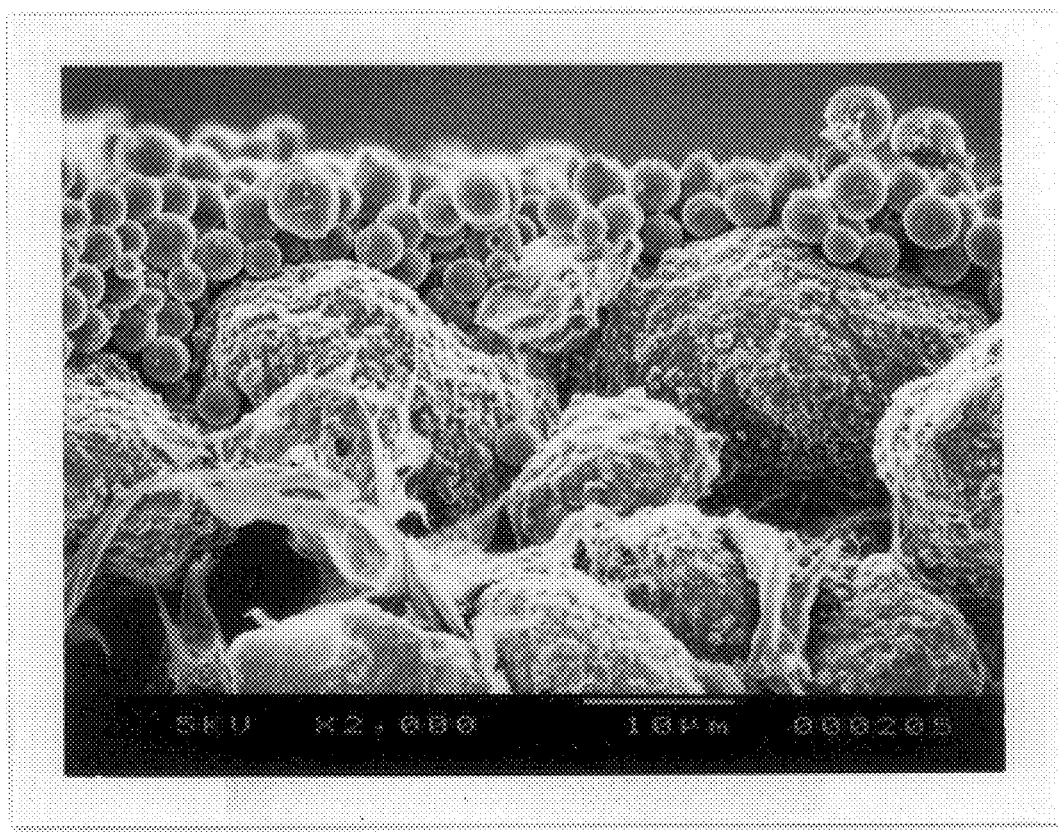
FIG. 3 is a diagram illustrating a section of the negative electrode (Y1)

A photograph of the surface of the negative electrode (Y1) is shown in FIG. 2. A photograph of the section of the negative electrode (Y1) is shown in FIG. 3. As can be seen in FIG. 2, there are spherical polymer particles present on the surface of the negative electrode. As can be seen in FIG. 3, the large particles shown in the lower part of the photograph is negative active material to form a negative electrode compound layer, and there are spherical polymer particle layer present on the surface of its negative electrode compound layer.

As can be seen in FIGS. 2 and 3, by applying a polymer particles to the negative electrode, and then subjecting the coated material to heat treatment, part of the surface of the polymer particles are bonded to each other to form three-dimensional continuous pores among the polymer particles.

Subsequently, the positive electrode (X) was similarly treated. In some detail, a suspension of a P(VdF/HFP) particle of 4 μm with free of micropores (dispersant: water) was applied to the surface of the positive electrode (X), and then dried at a temperature of 100° C. to prepare a positive electrode having a particulate P(VdF/HFP) layer having a porosity of about 50% and a thickness of 12 μm provided on both sides thereof. Thus, a positive electrode (X1) was prepared.

Subsequently, the positive electrode (X1) and the negative electrode (Y1) were laminated and wound to form an cell assembly. The cell assembly thus formed was then subjected to heat treatment at a temperature of 100° C. Thereafter, 1.7 g of the electrolyte was injected into the cell after the cell assembly was inserted in cell case to prepare a battery (A).

In the battery (A), the amount of the electrolyte relative to the amount of P(VdF/HFP) particle layer present between the positive electrode and the negative electrode is small. Therefore, the P(VdF/HFP) particles is swollen with the electrolyte to have ionic conductivity. However, there was little electrolyte presented in the three-dimensional continuous pores between the P(VdF/HFP) particles.

Battery (B) of example according to the invention

A battery (B) of the invention was prepared in the same manner as the battery (A) except that the injected amount of the electrolyte was changed to 1.9 g. In the battery (B), the amount of the electrolyte relative to the amount of P(VdF/HFP) particles present between the positive electrode and the negative electrode is large. Therefore, the P(VdF/HFP) particles swell in the electrolyte to have ionic conductivity. At the same time, the electrolyte is present also in the three-dimensional continuous pores between the P(VdF/HFP) particles. Accordingly, ions can smoothly move through the electrolyte.

Battery (C) of example according to the invention

A suspension of a microporous P(VdF/HFP) particle of 4 μm (dispersant: water) was applied to the surface of the positive electrode (X), and then subjected to heat treatment at a temperature of 100° C. to prepare a positive electrode (X2) having a P(VdF/HFP) particle layer having a porosity of about 60% and a thickness of 10 μm provided on both sides thereof.

Subsequently, a suspension of a microporous P(VdF/HFP) particle of 4 μm (dispersant: water) was applied to the surface of the negative electrode (Y), and then subjected to heat treatment at a temperature of 100° C. to prepare a positive electrode (Y2) having a P(VdF/HFP) particle layer having a porosity of about 64% and a thickness of 12 μm provided on both sides thereof.

Subsequently, the positive electrode (X2) and the negative electrode (Y2) were laminated and wound to form a cell assembly. The cell assembly thus formed was then subjected to heat treatment at a temperature of 100° C. Thereafter, 2.0 g of the electrolyte was injected into the cell after the cell assembly was inserted in cell case to prepare a battery (C). In the battery (C), the P(VdF/HFP) particles swell in the electrolyte to have ionic conductivity. At the same time, the electrolyte is present also in the three-dimensional continuous pores between the P(VdF/HFP) particles. Accordingly, ions can smoothly move through the electrolyte. Further, the electrolyte is present also in the micropores in the P(VdF/HFP) particles. Ions can also move through the electrolyte.

Battery (D) of example according to the invention

A suspension of a P(VdF/HFP) particle of 4 μm with free of micro pores (dispersant: water) was applied to the positive electrode (Y), and then subjected to heat treatment at a temperature of 100° C. The coated material was then pressed to prepare a positive electrode (X3) having a P(VdF/HFP) particle layer having a porosity of about 35% and a thickness of 9 μm provided on both sides thereof.

Subsequently, a suspension of a P(VdF/HFP) particle of 4 μm with free of micro pores(dispersant: water) was applied to the negative electrode (X), and then subjected to heat treatment at a temperature of 100° C. The coated material was then pressed to prepare a negative electrode (Y3) having a P(VdF/HFP) particle layer having a porosity of about 38% and a thickness of 7 μm provided on both sides thereof.

Figure 4:
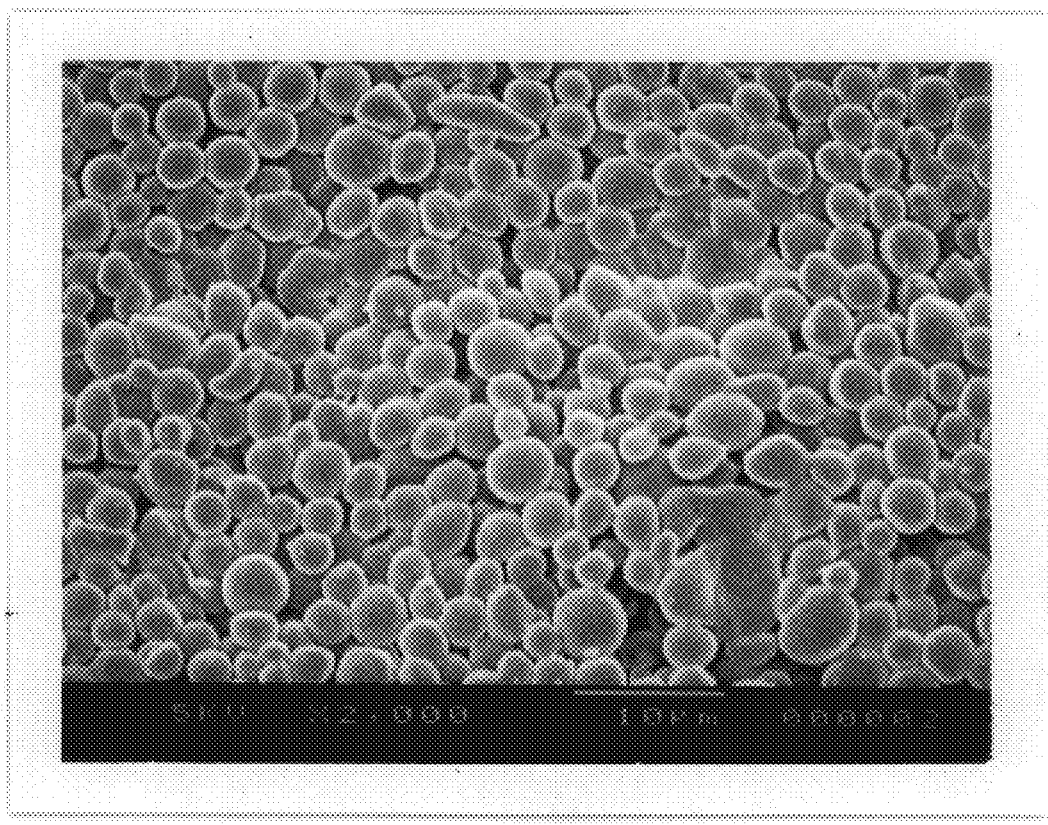
FIG. 4 is a diagram illustrating a surface of a negative electrode (Y3)

The surface of the negative electrode (Y3) is shown in FIG. 4. As can be seen in FIG. 4, although the shape of the P(VdF/HFP) particles on the surface of the negative electrode was slightly deviated from sphere due to pressing, the three-dimensional continuous pores among the P(VdF/HFP) particles were little blocked.

Subsequently, the positive electrode (X3) and the negative electrode (Y3) were laminated and wound to form a cell assembly. This cell assembly thus formed was then subjected to heat treatment at a temperature of 100° C. Thereafter, 1.7 g of the electrolyte was injected into the cell after the cell assembly was inserted in cell case to prepare a battery (C).

Battery (E) of example according to the invention

A battery (E) containing a porous P(VdF/HFP) provided in the positive electrode compound layer and the negative electrode compound layer was prepared.

The positive electrode (X) and the negative electrode (Y) were dipped in a 4 wt-% P(VdF/HFP)/NMP solution to impregnate the compound layer in the electrodes with the polymer solution. These electrodes were each passed through rollers to remove extra polymer solution from the surface of the electrodes. Further, these electrodes were each dipped in deionized water to extract NMP and provide porous P(VdF/HFP) in the compound layer in the electrodes. Thus, a positive electrode (X4) and a negative electrode (Y4) were prepared.

Thereafter, the positive electrode was pressed to reduce the thickness of the electrode, which is the sum of the thickness of the compound layer and the collector, from 280 $\mu$m to 175 $\mu$m. Further, the negative electrode was pressed to reduce the thickness of the electrode, which is the sum of the thickness of the compound layer and the collector, from 300 $\mu$m to 190 $\mu$m.

Subsequently, a suspension of a microporous P(VdF/HFP) particle of 4 $\mu$m (dispersant: water) was applied to the negative electrode (Y4), and then subjected to heat treatment at a temperature of 100° C. to prepare a negative electrode (Y5) having a microporous P(VdF/HFP) particle layer having a porosity of about 56% and a thickness of 16 $\mu$m provided on the surface thereof.

Subsequently, a suspension of a microporous P(VdF/HFP) particle of 4 $\mu$m (dispersant: water) was applied to the positive electrode (X4) to prepare a positive electrode (X5). The positive electrode (X5) and the negative electrode (Y5) were laminated and wound to form a cell assembly. This cell assembly thus formed was then subjected to heat treatment at a temperature of 100° C. Thereafter, 2.0 g of the electrolyte was injected into the cell after the cell assembly was inserted in cell case to prepare a battery (E).

Comparative Battery (F)

A suspension of a P(VdF/HFP) particle of 0.4 $\mu$m with free of micropores (dispersant: water) was applied to the negative electrode (X), and then subjected to heat treatment at a temperature of 100° C. to prepare a negative electrode (Y6) having a P(VdF/HFP) particle layer with a porosity of about 6% and a thickness of 6 $\mu$m provided on the surface thereof.

Figure 5:
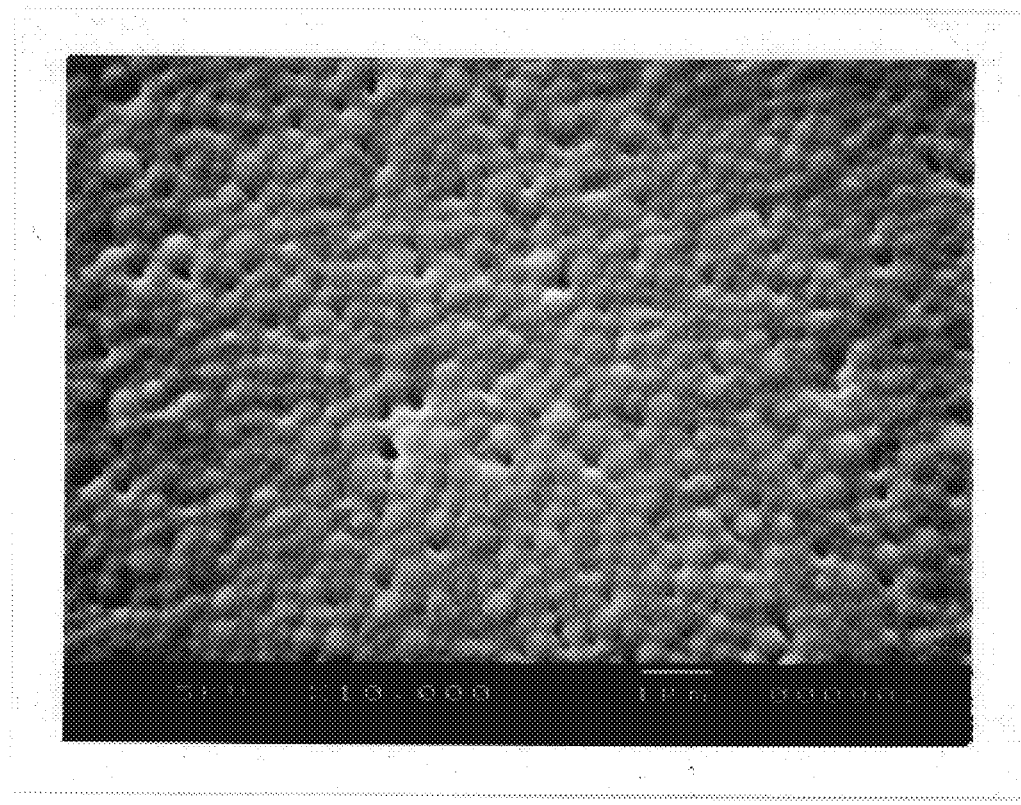
FIG. 5 is a diagram illustrating a surface of the negative electrode (Y6).

A photograph of the surface of the negative electrode (Y6) was shown in FIG. 5. As can be seen in FIG. 5, since most of the surface of the P(VdF/HFP) particles are connected to each other, the three-dimensional continuous pores among the P(VdF/HFP) particles are blocked. Thus, little pores were observed in the P(VdF/HFP) particle layer.

Subsequently, a positive electrode was similarly prepared. In some detail, a suspension of a P(VdF/HFP) particle of 0.4 $\mu$m with free of micropores (dispersant: water) was applied to the positive electrode (X) to prepare a positive electrode (Y6) having a P(VdF/HFP) particle layer with a porosity of about 6% and a thickness of 8 $\mu$m provided on the surface thereof.

Subsequently, the positive electrode (Y6) and the negative electrode (X6) were laminated and wound to form a cell assembly. This cell assembly thus formed was then subjected to heat treatment at a temperature of 100° C. Thereafter, 1.7 g of the electrolyte was injected into the cell after the cell assembly was inserted in cell case to prepare a battery (F).

Comparative Battery (G)

A battery (G) containing a porous PVdF membrane provided between the positive electrode and the negative electrode was prepared.

Firstly, 22 g of a PVdF powder was dissolved in 78 g of NMP. The resulting solution was applied to a glass plate to form a sheet thereon, dipped in water to extract NMP, and then dried to prepare a microporous PVdF membrane having a porosity of 67% and a thickness of 25 $\mu$m. The microporous PVdf membrane thus prepared was then cut into a sheet having a width of 22 mm to prepare a PVdF membrane.

Subsequently, the positive electrode (X) and the negative electrode (Y) were laminated with the PVdF membrane interposed therebetween and wound to form an cell assembly. 2.0 g of the electrolyte was then injected into the cell after the cell assembly was inserted in cell case to prepare a battery (G).

The batteries (A), (B), (C), (D) and (E) of examples according to the invention and the comparative batteries (F) and (G) were each charged with a current of 400 mA for 1 hour and then at a constant voltage of 4.1 V for 2 hours, and then discharged with a current of 400 mA to 2.75 V at a temperature of −10° C. The results are shown in FIG. 1. In FIG. 1, the symbols A to G indicate the discharge performance of the batteries (A) to (G), respectively.

As can be seen in the foregoing results, the batteries (A), (B), (C), (D) and (E) of examples according to the invention exhibit a greater discharge capacity than the comparative battery (G). It is presumed that the battery (A) of example according to the invention allows lithium ions to move rapidly through the electrolyte present on the surface of the P(VdF/HFP) particles and thus exhibits improved high rate discharge performance.

In the battery (B) of example according to the invention, the P(VdF/HFP) particles is swollen with the electrolyte to have ionic conductivity. At the same time, the electrolyte is present also in the three-dimensional continuous pores among the P(VdF/HFP) particles. Ions can smoothly move through the electrolyte. The battery (C) has advantages in addition to the battery (B). The electrolyte is present also in the micropores in the P(VdF/HFP) particles. Ions can also move through the electrolyte. Further, the battery (E) has advantages in addition to the battery (C). Since a porous P(VdF/HFP) copolymer is provided in the positive electrode compound layer and negative electrode compound layer, ions can move more smoothly between P (VdF/HFP) in the electrodes and P (VdF/HFP) particles provided between the electrodes.

Thus, the batteries (A), (B), (C) and (E) of examples according to the invention have a greater uniformity in the size and distribution of three-dimensional continuous pores formed between the ion-conductive polymer particles and hence in the current distribution than the comparative battery (G) having a porous PVdF membrane. Further, the positive electrode and the negative electrode can be insulated from each other without causing internal shortcircuit, and the thickness of the ion-conductive polymer particles layer can be reduced, making it possible for lithium ions to rapidly move between the positive electrode and the negative electrode.

Further, the battery (D) of example according to the invention has a lower discharge capacity than the battery (B), (C) and (E) of example according to the invention but a greater discharge capacity than the comparative battery (G). This is because when the polymer particles layer is pressed, the polymer particles are crushed, causing some of the three-dimensional continuous pores among the polymer particles to be blocked. Nevertheless, most of the continuous pores are left unblocked. Thus, lithium ions can rapidly move through the three-dimensional continuous pores.

Further, it was made obvious that the comparative battery (F) has a lower discharge capacity than the comparative battery (G). This is because the three-dimensional continuous pores among the ion-conductive polymer particles in the comparative battery (F) are mostly blocked, providing little or no pores communicating between the positive electrode and the negative electrode.

Further, it was found out that the battery having electrodes attached a porous resin layer formed by insulating PE particles to their surfaces has discharge capacity similar to the comparative battery (G).

Subsequently, the batteries (A), (B), (C), (D) and (E) of examples according to the invention and the comparative battery (G) were each subjected to safety test. In some detail, they were each charged with a current of 400 mA to 4.5 V and then at a constant voltage of 4.5 V for 2 hours, and then external short-circuited at room temperature.

As a result, none of 20 samples of the batteries (A), (B), (C), (D) and (E) of examples according to the invention caused its safety valve to operate. None of these batteries showed smoking. On the contrary, the comparative battery (G) caused its safety valve to operate and showed smoking.

The reason why these phenomena occur is presumably that the batteries (A), (B), (C), (D) and (E) of examples according to the invention have a good uniformity in the size and distribution of the three-dimensional continuous pores randomly formed in the ion-conductive polymer particles layer and composed of polymer particles overlapped three-dimensionally and thus fulfill its shutdown function efficiently. Further, since the current distribution is uniform, the dendritic lithium caused by non-uniformity of current distribution can hardly occur.

As mentioned above, the nonaqueous electrolyte battery according to the invention includes an ion-conductive polymer particles provided between a positive electrode and a negative electrode, the positive electrode and the negative electrode being insulated from each other by the polymer particles. Further, three-dimensional continuous pores are formed among the ion-conductive polymer particles. A nonaqueous electrolyte is contained in the three-dimensional continuous pores.

Accordingly, lithium ions can rapidly move between the positive electrode and the negative electrode through the three-dimensional continuous pores. Further, in the present invention, the size and distribution of the three-dimensional continuous pores formed among the ion-conductive polymer particles are uniform, rendering the current distribution uniform. Accordingly, the high rate discharge performance and safety of the nonaqueous electrolyte battery according to the invention are very excellent.

Further, merely providing an ion-conductive polymer particles layer on the surface of electrodes, the positive electrode and the negative electrode can be insulated from each other, making it very easy to prepare a nonaqueous electrolyte battery. Moreover, the nonaqueous electrolyte battery comprising a positive electrode, a negative electrode and an ion-conductive polymer particles layer integrated with each other can exhibit an enhanced safety particularly when overcharged.

Further, by using spherical ion-conductive polymer particles, the filling factor of the polymer particles can be increased, making it difficult for the occurrence of shortcircuit between the positive electrode and the negative electrode even when the thickness of the polymer particle layer is reduced. Moreover, since there is no unevenness inhibiting the moving of lithium ions, the current distribution is uniform, providing the nonaqueous electrolyte battery according to the invention with better high rate discharge performance and safety.

What is claimed is:

1. A nonaqueous electrolyte battery comprising:
   a positive electrode;
   a negative electrode; and
   an ion-conductive polymer particles provided between said positive electrode and said negative electrode,
   wherein said positive electrode and said negative electrode are insulated from each other by said polymer particles, and
   three-dimensional continuous pores are formed among said polymer particles, and said three-dimensional continuous pores contain a nonaqueous liquid electrolyte.

2. The nonaqueous electrolyte battery according to claim 1, wherein said ion-conductive polymer particles are wetted or swollen with said nonaqueous electrolyte.

3. The nonaqueous electrolyte battery according to claim 1, wherein said ion-conductive polymer particles have micropores which contain said nonaqueous electrolyte.

4. The nonaqueous electrolyte battery according to claim 1, wherein said ion-conductive polymer particles are fixed to a surface of at least one of said positive electrode and said negative electrode.

5. The nonaqueous electrolyte battery according to claim 1, wherein a shape of said ion-conductive polymer particles is spherical.

6. The nonaqueous electrolyte battery according to claim 1, wherein an average particle size of said ion-conductive polymer particles is not more than that of active material particles of at least one of said positive electrode and said negative electrode.

7. The nonaqueous electrolyte battery according to claim 1, wherein an ion-conductive polymer particles layer comprising said ion-conductive polymer particles provided between said positive electrode and said negative electrode has a porosity in the range of 10 to 90%.

8. The nonaqueous electrolyte battery according to claim 7, wherein the porosity of said ion-conductive polymer particles layer is in a range of 30 to 70%.

9. The nonaqueous electrolyte battery according to claim 8, wherein the porosity of said ion-conductive polymer particles layer is in a range of 30 to 60%.

10. The nonaqueous electrolyte battery according to claim 1, wherein an average particle size of said ion-conductive polymer particles is 0.5 $\mu$m or more.

11. The nonaqueous electrolyte battery according to claim 10, wherein the average particle size of said ion-conductive polymer particles is 0.8 µm or more.

12. The nonaqueous electrolyte battery according to claim 11, wherein the average particle size of said ion-conductive polymer particles is 1.0 µm or more.

13. The nonaqueous electrolyte battery according to claim 12, wherein the average particle size of said ion-conductive polymer particles is 1.2 µm or more.

14. The nonaqueous electrolyte battery according to claim 3, wherein said ion-conductive polymer particles have continuous micropores.

15. The nonaqueous electrolyte battery according to claim 1, wherein said ion conductive polymer particles have lithium ion conductivity.

16. The nonaqueous electrolyte battery according to claim 1, wherein a melting point of said ion-conductive polymer particle is in the range of 80° C. to 200° C.

17. The nonaqueous electrolyte battery according to claim 16, wherein the melting point of said ion-conductive polymer particles is in the range of 80° C. to 160° C.

18. The nonaqueous electrolyte battery according to claim 17, wherein the melting point of said ion-conductive polymer particles is in the range of 80° C. to 120° C.

19. A nonaqueous electrolyte battery comprising:

a positive electrode;

a negative electrode; and an ion-conductive polymer particles provided between said positive electrode and said negative electrode, wherein said positive electrode and said negative electrode are insulated from each other by said polymer particles, wherein said ion-conductive polymer particles contain an elastomer.

20. A nonaqueous electrolyte battery comprising:

a positive electrode;

a negative electrode; and an ion-conductive polymer particles provided between said positive electrode and said negative electrode, wherein said positive electrode and said negative electrode are insulated from each other by said polymer particles, wherein the polymer in said ion-conductive polymer particles is crosslinked.

21. A nonaqueous electrolyte battery comprising:

a positive electrode;

a negative electrode; and an ion-conductive polymer particles provided between said positive electrode and said negative electrode, wherein said positive electrode and said negative electrode are insulated from each other by said polymer particles, wherein said ion-conductive polymer particles have a core portion and a shell portion, and the material of said core portion is different from that of said shell portion.

22. The nonaqueous electrolyte battery according to claim 21, wherein a melting point of said core portion is higher than that of said shell portion.

23. A nonaqueous electrolyte battery comprising:

a positive electrode;

a negative electrode;

an ion-conductive polymer particles provided between said positive electrode and said negative electrode, wherein said positive electrode and said negative electrode are insulated from each other by said polymer particles; and an electrolyte and a separator, wherein an amount of said electrolyte is in the range of 30% to 100% based on the total pore volume in said positive and negative electrodes, said ion-conductive polymer particles layer and said separator.

* * * * *